UNITED STATES PATENT OFFICE.

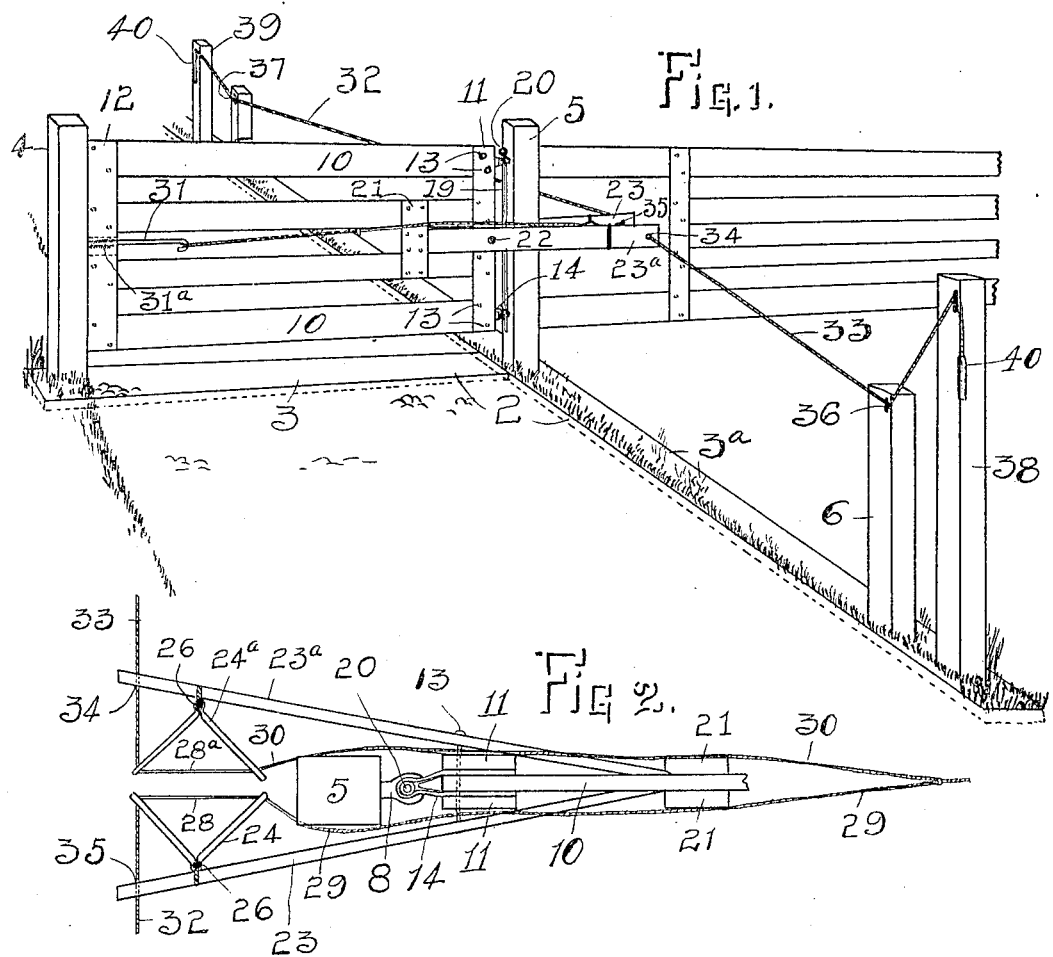

MATHIAS EFFLAND, OF GALESBURG, ILLINOIS.

GATE.

No. 927,779.      Specification of Letters Patent.      Patented July 13, 1909.

Application filed March 1, 1909. Serial No. 480,628.

*To all whom it may concern:*

Be it known that I, MATHIAS EFFLAND, a citizen of the United States, residing at Galesburg, in the county of Knox and State of Illinois, have invented certain new and useful Improvements in Gates, of which the following is a specification.

My invention relates to that class thereof generally known as "farm gates", which swing in either direction, but from the operator, when a cord or rope is drawn upon by a person in a vehicle (or, of course, upon the ground,) and which, after the vehicle has passed through the gateway, may be swung to a closed position and there secured by a simple latch mechanism, by the operator drawing on a cord at that side of the gate.

The primary object of the invention is to provide a device of the character described which will be simple, economic of manufacture, strong, durable and not disposed to become disabled or out of order; which will not sag and which cannot be raised by an animal attempting to pass beneath it; and, finally, which will be effective in operation.

To these ends the invention consists in the mechanism hereinafter described.

Mechanism showing the preferred structural features, connection and mutual relationship of the several parts of my improvements, (and a base upon which they may be mounted if desired,) is illustrated in the accompanying drawings, in which:—

Figure 1 is a perspective showing the gate in its closed position, and Fig. 2, a reversed plan of the hinge-end of the gate.

Similar numerals of reference are used to indicate similar parts of the device in the accompanying drawings, in which 2 represents a rectangular base, preferably of wood and comprising a strip 3 adapted to extend under the gate when closed, and $3^a$ indicates a similar strip at right angles thereto and adapted to lie beneath the gate when it is in either of its open positions. The base is preferably laid in the ground, flush with the surface thereof, and serves to give rigidity to the posts 4, 5, 6 and 7 presently described. It may, however, be dispensed with and said posts set in the ground in the ordinary manner.

Fixed in the face of the main or gate-supporting post 5 are heavy screw-eyes or staples 8 for a purpose hereinafter described.

The body of the gate may be of any ordinary and preferred construction. As shown, it comprises longitudinal bars 10 secured together at their respective ends by plates 11 and 12. Fixed by bolts 13 between the plates 11 are hinge-members 14, fashioned by bending a strap of metal at its midlength to form an eye, slotting said eye, and punching registering apertures in the end thereof, through which apertures and through apertures in the plates 11 bolts are passed and secured in the usual manner. The eyes 8 are seated in the slots of the hinge members and a long pintle 19 having a head 20 is passed downwardly through the eyes 8 and those of said hinge members.

It will be evident that a gate thus supported will be free to swing in either direction, that it will neither sag nor list, and that an animal cannot raise it and pass thereunder.

Secured between cleats 21 and preferably about midheight of the rear end of the gate, and further fixed by means of a rod 22 are the meeting ends of divergent arms 23, $23^a$, near the outer ends of which are fulcrumed bell-crank levers 24, $24^a$ respectively, each formed by bending a metal strip at its midlength and there forming an eye through which is passed any suitable pivotal means 26 by which the levers are secured to said arms. Wires or rods 28, $28^a$ respectively prevent the extremities of the lever arms from spreading. The ends of said arms are provided with eyes. In the eyes in the inner lever-arms are secured wires or cables 29, 30 respectively, which cables are united at their outer ends and there connected to the tail of an elongated latch-bolt 31. In the apertures of the outer lever-arms are secured actuating ropes or cables 32, 33 respectively, which ropes respectively pass through apertures 34, 35 in the outer ends of the divergent arms, thence through staples 36, 37 in the secondary latch posts 6 and 7 respectively, their outer ends passed through staples in what I may term cable-posts 38 and 39, and a pull-bar fixed thereto within easy reach of the operator.

Any suitable latch mechanism, as 31, $31^a$, may be secured on the gate, and each latch-post is provided with means wherewith it engages.

The operation:—The gate being in its closed position and a vehicle traveling in either direction, the operator seated in said vehicle will draw upon the convenient pull-bar 40 and thereby, through the medium of the cable, draw upon the proximal arm of that lever with which it is connected, to swing it on its fulcrum and thereby draw rearwardly on the wire to draw back the bolt and to throw the gate open in the direction of the path of travel of the vehicle. After the vehicle has passed through the gateway the operator will grasp the pull-bar at that side thereof, draw downwardly thereupon, and thereby release the bolt in a manner like unto that above recited, and by acting on the lever on the proximal divergent bar will return the gate to its closed position.

The advantages of the invention will be apparent, and the operation will be understood from the foregoing description, it being particularly noted that various changes may be made in the details of construction without departing materially from the general idea involved.

Having thus illustrated and described my invention in its preferred embodiment, I claim as new:—

In a gate, a main post, a gate proper hinged thereto to swing in both directions from its normal position, a latch element on said gate, a latch-post, divergent arms fixed to the hinged end of said gate, each arm provided with an eye near its outer end, an independently acting bent lever fulcrumed on each of said arms, secondary latch-posts disposed rectangularly to the gate when in its closed position, a staple on each of said posts, cable-posts, cables fixed to the ends of the outer arms of each of said levers, passed thence through the aforesaid eyes in the divergent arms, thence through the staples aforesaid and extended past the cable-posts, and a cable fixed to the inner end of each of said levers and connected to the aforesaid latch.

In testimony whereof I hereunto set my hand this 20th day of February, 1909.

MATHIAS EFFLAND.

Witnesses:
JAMES E. DAVIS,
H. M. RICHARDS.